W. C. BARR.
SHOCK ABSORBER.
APPLICATION FILED MAR. 10, 1919.
1,317,417.
Patented Sept. 30, 1919.
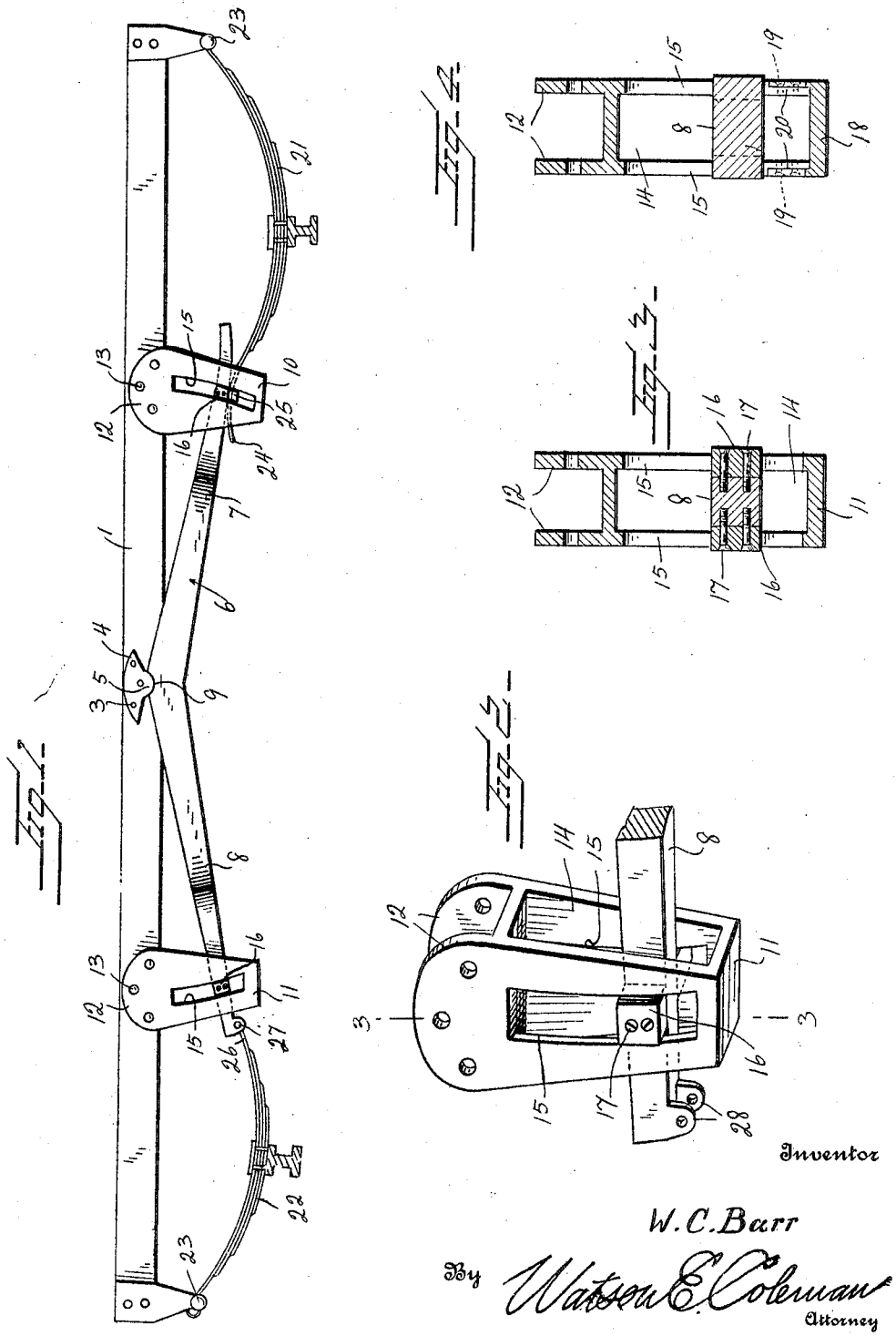
Inventor
W. C. Barr
By Watson E. Coleman
Attorney

UNITED STATES PATENT OFFICE.

WILSON CLARENCE BARR, OF PITTSBURGH, PENNSYLVANIA.

SHOCK-ABSORBER.

1,317,417.   Specification of Letters Patent.   Patented Sept. 30, 1919.

Application filed March 10, 1919.   Serial No. 281,700.

*To all whom it may concern:*

Be it known that I, WILSON C. BARR, a citizen of the United States, residing at Pittsburgh, in the county of Allegheny and State of Pennsylvania, have invented certain new and useful Improvements in Shock-Absorbers, of which the following is a specification, reference being had to the accompanying drawings.

This invention relates to an improved guiding device, particularly adapted for use in connection with shock absorbers and equalizers, especially of the kind hereinafter described.

One of the objects of the invention is to provide a guiding device for use in connection with shock absorbers and equalizers of the kind herein shown, which includes an equalizing bar on the chassis or frame, said guiding device comprising brackets secured on the side of the frame and having arcuate guides concentric with the fulcrum of the equalizing bar, and through which brackets the ends of the bar engage, to prevent lateral movement of the bar, and means on the ends of the bar to prevent longitudinal movement of the bar relatively to the brackets and the frame.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in side elevation of a portion of an automobile chassis or frame, the forward and rear bowed springs, which are connected to the axles in a conventional manner, and illustrating the improved shock absorber or equalizer as applied.

Fig. 2 is an enlarged detail view in perspective looking upwardly illustrating one of the depending guide brackets of the chassis, and showing the shock absorber or equalizer bar or member engaging therewith.

Fig. 3 is a sectional view vertically on line 3—3 of Fig. 2.

Fig. 4 is a sectional view similar to Fig. 3 but illustrating offset lugs as being constructed integral with the shock absorber or equalizer bar, and guided in a depending guide bracket, the guide slots or offset lugs being open at their lower ends.

Referring more especially to the drawings 1 designates side rails of the chassis or frame of the automobile, and bolted or otherwise secured at 3 to the outer side of each of the side rails is a casting 4 provided with a fulcrum bearing 5. A shock absorber or equalizing bar 6 is provided and this bar has its arms 7 and 8 extending at an obtuse angle. Where these arms adjoin, substantially centrally of the shock absorbing or equalizing bar, a fulcrum engaging notch 9 is constructed, engaging the bearing 5, and it is obvious that as the chassis or frame of the automobile vibrates incident to the wheels passing over rough road beds, the shock absorbing or equalizing bar will rock or oscillate.

Forward and rear guide brackets 10 and 11 are supplied, and each of these brackets is in the form of a skeleton frame. Each bracket is provided with upstanding ears or side plates 12, engaging on opposite faces of the side rail of the chassis, and is bolted or riveted thereto as shown at 13. In other words, these ears or side plates afford a U-shaped structure, which straddles the side rail of the chassis upwardly, thereby preventing displacement of the bracket. The body of the bracket in side elevation is V-shaped or tapered as shown, and since each bracket is substantially of a skeleton form, it is provided with vertically arranged slots 14 and 15. The slot 14 is arranged in a plane with the side rails of the chassis, while the slot 15 is at right angles to the side rail. The forward and rear ends of the shock absorbing or equalizing bar extend through the slots 14 of the brackets, and adjacent the extremities of the arms of the bar, laterally extending offset lugs 16 are formed. It is obvious that these offset lugs 16 engage in the slots 15, thereby guiding and preventing lateral displacement of the shock absorbing or equalizing bar 6. That is, the ends of this bar 6 are prevented from lateral movement excessively. It is obvious that these offset lugs 16 may be formed integral with the bar 6, or detachably fastened thereto, for instance by means of screws or bolts 17, as shown in Figs. 1, 2 and 3. Evidently, it is obvious that when the offset lugs are detachably fastened to the bar 6, the lower ends of the depending brackets or skeleton frames may be closed, as shown clearly in Figs. 1, 2 and 3. However, when the offset lugs are constructed integral with the bar 6, the lower ends of the depending brackets or skeleton frames are closed by U-shaped plates 18, which are secured by bolts 19 to the side plates of the brackets. The U-shaped plates 18 arch the side plates of the brackets, and the sides of the U-shaped plates are counter-sunk in recesses 20 of the outer faces of the sides of the brackets. By constructing the offset lugs detachably as shown in Figs. 1, 2 and 3, it is possible to insert the end of the bar 6 and subsequently engage the offset lugs through the slots 15, and then fasten them by screws to the bar. By fastening the U-shaped plates 18 to the sides of the brackets, it is possible to construct the offset lugs integral with the bar 6, and in such a case the ends of the bar 6 may be passed upwardly between the sides of the brackets, after which the U-shaped plates 18 may be fastened in place, to hold the ends of the bar 6 in engagement with the brackets. It is to be noted that the slots in the brackets are elongated enough to permit of a wide range of play of the ends of the bar, the offset lugs guiding the bar, and preventing longitudinal and lateral displacement of the bar.

The usual or conventional forward and rear bowed springs 21 and 22 are provided and are connected at 23 in the usual manner to the ends of the chassis or frame of the automobile. The rear end 24 of the front spring 21 engages through the slot 14 of the vehicle bracket and has a sliding engagement with the forward end of the bar 6, intermediate a pair of depending ears 25 of the forward end of the bar 6. The forward end 26 of the rear bowed spring has a pivotal connection 27 between the ears 28 of the rear end of the bar 6.

It is apparent from the construction illustrated and set forth that all shocks or vibrations will be absorbed or equalized, incident to the automobile passing over rough road beds, the bar 6 acting to coöperate with the springs 21 and 22, to insure this equalizing effect.

The invention having been set forth, what is claimed as new and useful is:

1. In a device as set forth including a frame and having bowed springs connected to the ends of the frame, and an equalizing bar pivotally mounted on the side of the frame, with the opposite ends of which the adjacent ends of the springs coöperate; guide brackets secured to the sides of the frame and being of skeleton form and having arcuate guides concentric with the pivot of the equalizing bar, and means on the end portions of the equalizing bar engaging said arcuate guides, to relieve the lateral strains of the coöperating parts to hold the bar in position relatively to the frame and the brackets.

2. In a device as set forth, including a frame having a side fulcruming bearing, an equalizing bar engaging said bearing, guide brackets secured on the side of the frame, and being skeleton in form, and through which the opposite ends of the bar movably engage, said guide brackets having arcuate guides concentric with the fulcruming bearing, means on the ends of the bar engaging said arcuate guides to prevent longitudinal movement of the bar, and yieldable means carried by the ends of the frame and coöperating with the ends of the bar, to equalize the shocks.

3. In a device as set forth including a frame having on its side a fulcruming bearing; guide brackets secured on the side of the frame, one spaced on each side of the bearing, and having arcuate guides concentric with the bearing, an equalizing bar having its central portion fulcruming on the bearing and having its arms at an obtuse angle and having their extremities engaging through the guide brackets to prevent lateral movement of the bar, the ends of the arms of the bar having means engaging in the arcuate guides to prevent longitudinal movement of the bar relatively to the frame, and resilient means connected to the ends of the frame and in turn coöperating with the end portions of the bar.

4. In a device as set forth including a frame having a fulcruming bearing on its side; brackets secured to the side of the frame, one spaced on each side of the bearing, said brackets being skeleton in form, the sides of the brackets having arcuate guides concentric with the bearing, an equalizing bar mounted on and engaging the bearing and having its opposite ends passing through the skeleton brackets, the ends of the bar having removable elements engaging in the arcuate guides to prevent longitudinal movement of the bar, and resilient means connected to the opposite ends of the frame and coöperating with the ends of the bar.

5. In a device as set forth, including a frame having a bearing on its side; brackets secured on the frame, one spaced on each side of the bearing, said brackets being rectangular and skeleton in form, the sides of the brackets having arcuate guides concentric with the bearing, and an equalizing bar mounted on the bearing and having its ends engaging through the brackets to prevent lateral movements of the ends of the bar, detachable means on the sides of the ends of the bar slidably engaging the arcuate guides, to prevent longitudinal movement of the bar, and spring means for the ends of the bar.

In testimony whereof I hereunto affix my signature in the presence of two witnesses.

WILSON CLARENCE BARR.

Witnesses:
   JAS. F. GALLAGHER,
   M. A. LEHMER.

Copies of this patent may be obtained for five cents each, by addressing the "Commissioner of Patents, Washington, D. C."